US012117145B1

(12) United States Patent
Ma

(10) Patent No.: US 12,117,145 B1
(45) Date of Patent: Oct. 15, 2024

(54) HEATER-PLATE-AFFIXED LIGHT-EMITTING DIODE LAVA LAMP

(71) Applicant: Lishan Ma, Dongguan (CN)

(72) Inventor: Lishan Ma, Dongguan (CN)

( * ) Notice: Subject to any disclaimer, the term of this patent is extended or adjusted under 35 U.S.C. 154(b) by 0 days.

(21) Appl. No.: 18/660,863

(22) Filed: May 10, 2024

(30) Foreign Application Priority Data

Jul. 21, 2023 (CN) ......................... 202321941569.9

(51) Int. Cl.

| | |
|---|---|
| ***F21V 17/10*** | (2006.01) |
| ***F21S 10/00*** | (2006.01) |
| ***F21V 21/06*** | (2006.01) |
| ***F21V 23/00*** | (2015.01) |
| ***F21V 23/04*** | (2006.01) |
| ***F21V 29/90*** | (2015.01) |
| ***F21Y 115/10*** | (2016.01) |

(52) U.S. Cl.
CPC .......... *F21V 17/101* (2013.01); *F21S 10/002* (2013.01); *F21V 21/06* (2013.01); *F21V 23/002* (2013.01); *F21V 23/045* (2013.01); *F21V 29/90* (2015.01); *F21Y 2115/10* (2016.08)

(58) Field of Classification Search
CPC ...... F21V 17/101; F21V 29/90; F21V 10/002; F21V 21/06; F21V 23/002; F21V 23/045
See application file for complete search history.

(56) References Cited

U.S. PATENT DOCUMENTS 5,938,318 A * 8/1999 Mattsen .............. F21V 33/0028 362/811
2007/0291472 A1* 12/2007 Finkle ................... F21S 10/002 362/244
2008/0184605 A1* 8/2008 Finkle ..................... A47F 11/10 40/406
2011/0050104 A1* 3/2011 Finkle .................... H05B 45/10 315/117
2017/0276326 A1* 9/2017 Ho ........................ F21S 10/002

* cited by examiner

*Primary Examiner* — Bryon T Gyllstrom
(74) *Attorney, Agent, or Firm* — WPAT, P.C

(57) ABSTRACT

A heater-plate-affixed LED lava lamp includes: a base defining a chamber and a transparent lava lamp bottle located on the base. A control device is located in the chamber and includes a control circuit board located at the bottom of the chamber and a heat-generating module connected to the control circuit board. The heat-generating module includes a heater plate affixed to the bottom of the transparent lava lamp bottle to generate heat. By affixing the heater plate to the bottom of the transparent lava lamp bottle, the heater plate, when the lava lamp is subjected to an external force, can maintain being-affixed state without shaking or randomly swaying, which ensures the heating efficiency. Meanwhile, the way of using the heater plate to heat also enables the heating plate to be completely adhered to the transparent lava lamp bottle, which reduces the loss of heat and avoids the waste of energy.

8 Claims, 6 Drawing Sheets

HEATER-PLATE-AFFIXED LIGHT-EMITTING DIODE LAVA LAMP

CROSS-REFERENCE TO RELATED APPLICATION

This application claims priority to Chinese Patent Application No. 202321941569.9, filed Jul. 21, 2023, which is herein incorporated by reference in its entirety.

TECHNICAL FIELD

The disclosure relates to the field of decorative lamps and lanterns, and particularly to a heater-plate-affixed light-emitting diode (LED) lava lamp.

BACKGROUND

A lava lamp is a kind of decorative wax water lamp with a strong sense of dynamics. The lava lamp can achieve a brilliant effect by illuminating wax and water, and can change the color of light, making it adaptable for different occasions and creating different effects.

Lava lamps currently appearing on the market have many shortcomings, for example, Chinese patent with patent application number of 201320214659.8 (corresponding publication No. 203286439 U) discloses an energy-saving color-changing glitter lamp and lava lamp device. The device includes: a base, a hollow bottom shell located on the base, a hollow bottle body located on the bottom shell and a movable top cover located on the hollow bottle. A LED lamp and a bud rod are located in the bottom shell, a heater plate is located on a top of the bud rod and a bottom of the hollow bottle body. The bottom shell is equipped with at least one color-changing LED lamp. In this structure, the heater plate is movably arranged on the bottom shell. When the lava lamp is subjected to an external force, the heater plate may shake and be off-center, leading to weakened heating effect or even no heating effect. As the heater plate is a plane structure and the bottom of the bottle body is a concave structure, the heater plate may not completely fit the bottom of the bottle body, thereby affecting the heating efficiency and resulting in a waste of energy.

SUMMARY

In order to overcome the shortcomings of the related art, the present disclosure provides a heater-plate-affixed LED lava lamp.

Technical solutions of the present disclosure are as follows: A heater-plate-affixed LED lava lamp includes: a base, a transparent lava lamp bottle (also referred to as wax bottle) located on the base, and a control device. The base defines an opening upwardly-facing chamber (i.e., chamber). The control device is located in the chamber and includes: a control circuit board located at the bottom of the chamber and a heat-generating module connected to the control circuit board. The heat-generating module includes a heater plate affixed to the bottom of the transparent lava lamp bottle and multiple heating wires. The heater plate is configured to heat the bottom of the transparent lava lamp bottle and the multiple heating wires are electrically connected between the heater plate and the control circuit board. The heater plate includes an adhesive layer, an insulating layer, a heating layer and a wrapping layer. The insulating layer is tightly adhered to the bottom of the transparent lava lamp bottle by the adhesive layer, and the heating layer is wrapped around the insulating layer by the wrapping layer.

In an embodiment, the control device further includes a lighting module. The lighting module is electrically connected to the control circuit and configured to emit light to the transparent lava lamp bottle.

In an embodiment, an end of each of the multiple heating wires is connected to the heating layer and the other end of each of the multiple heating wires is connected to the control circuit board. The length of the multiple heating wires is 1.5 to 2 times the height of the chamber.

In an embodiment, the heater plate defines a light-transmitting area in the middle of the heater plate. The light emitted by the lighting module passes through the light-transmitting area and irradiates onto an interior of the transparent lava lamp bottle. The light-transmitting area can be a transparent film or a hole.

In an embodiment, the light-transmitting area is the hole. The heater plate defines a notch configured to make the heater plate fitted to a special-shaped surface and the notch is connected to the light-transmitting area.

In an embodiment, the base includes a base body, a holder and a cup body. The holder is located at the top of the base body, the cup body is located at the top of the holder and the base defines the chamber.

In an embodiment, the holder and the base body together define a cavity. A bottom of the cup body defines a through hole connected to the cavity. An inductive probe protrudes outwardly from the through hole. The inductive probe is electrically connected to the control circuit board to receive control signals.

In an embodiment, the base body is a circular structure. The bottom of the base body is provided with a support surface and the support surface is provided with an anti-slip sheet.

The present disclosure has the following advantages and beneficial effects: by affixing the heater plate to the bottom of the transparent lava lamp bottle, when the lava lamp is subjected to an external force, the heater plate can always maintain being-affixed state without shaking or randomly swaying, which ensures the heating efficiency. At the same time, the way of using the heater plate to heat also enables the heating plate to be completely adhered to the transparent lava lamp bottle, which reduces the loss of heat and avoids the waste of energy.

BRIEF DESCRIPTION OF DRAWINGS

The present disclosure is further described below in conjunction with the drawings and embodiments.

DETAILED DESCRIPTION OF EMBODIMENTS

In order to make the purpose, technical solutions and advantages of the embodiments of the present disclosure clearer, the technical solutions of the embodiments of the present disclosure will be clearly and completely described below in conjunction with drawings. The present disclosure is not limited to the following embodiments.

Figure 1:
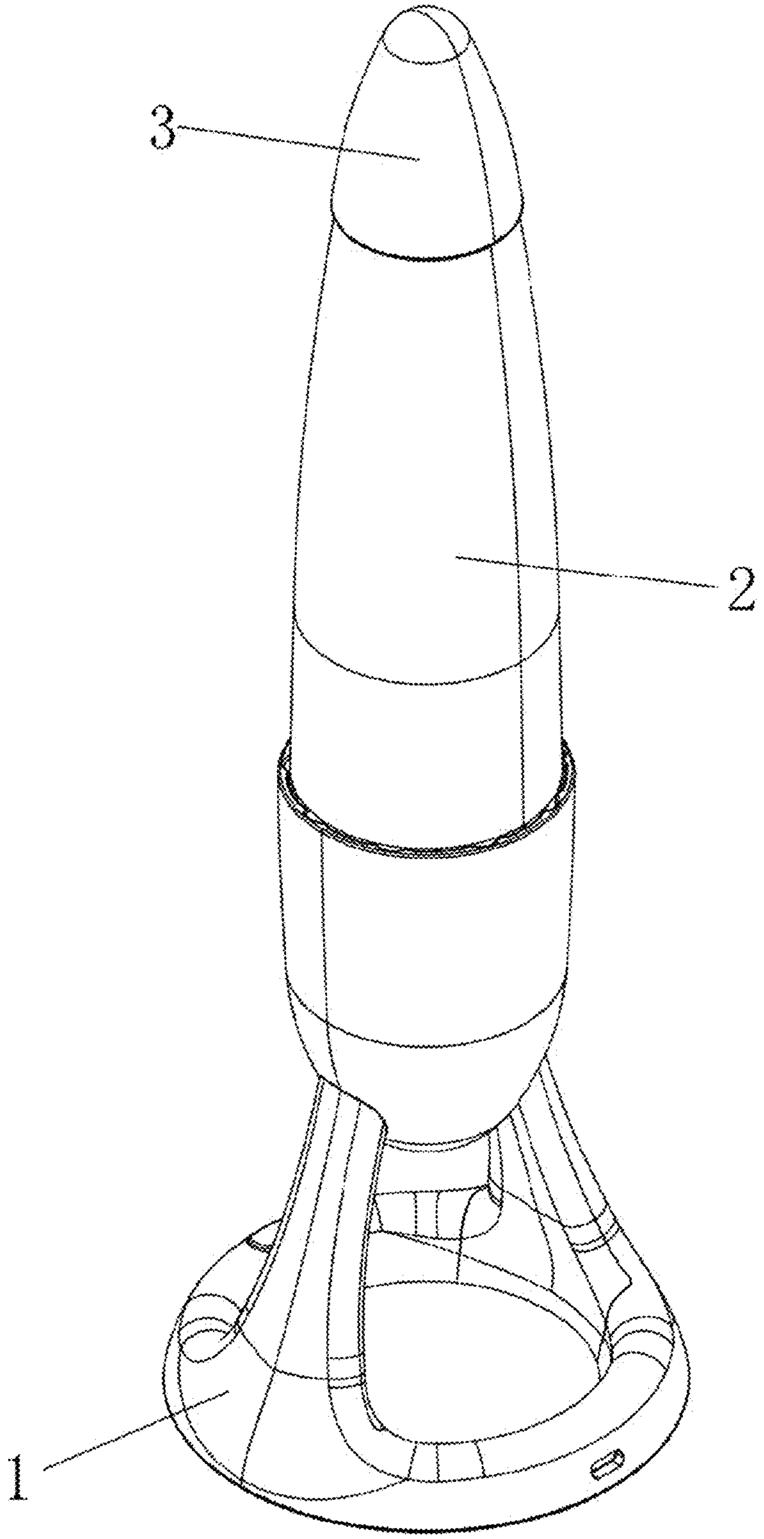
FIG. 1 illustrates a schematic diagram of a lava lamp according to an embodiment of the present disclosure.
Figure 2:
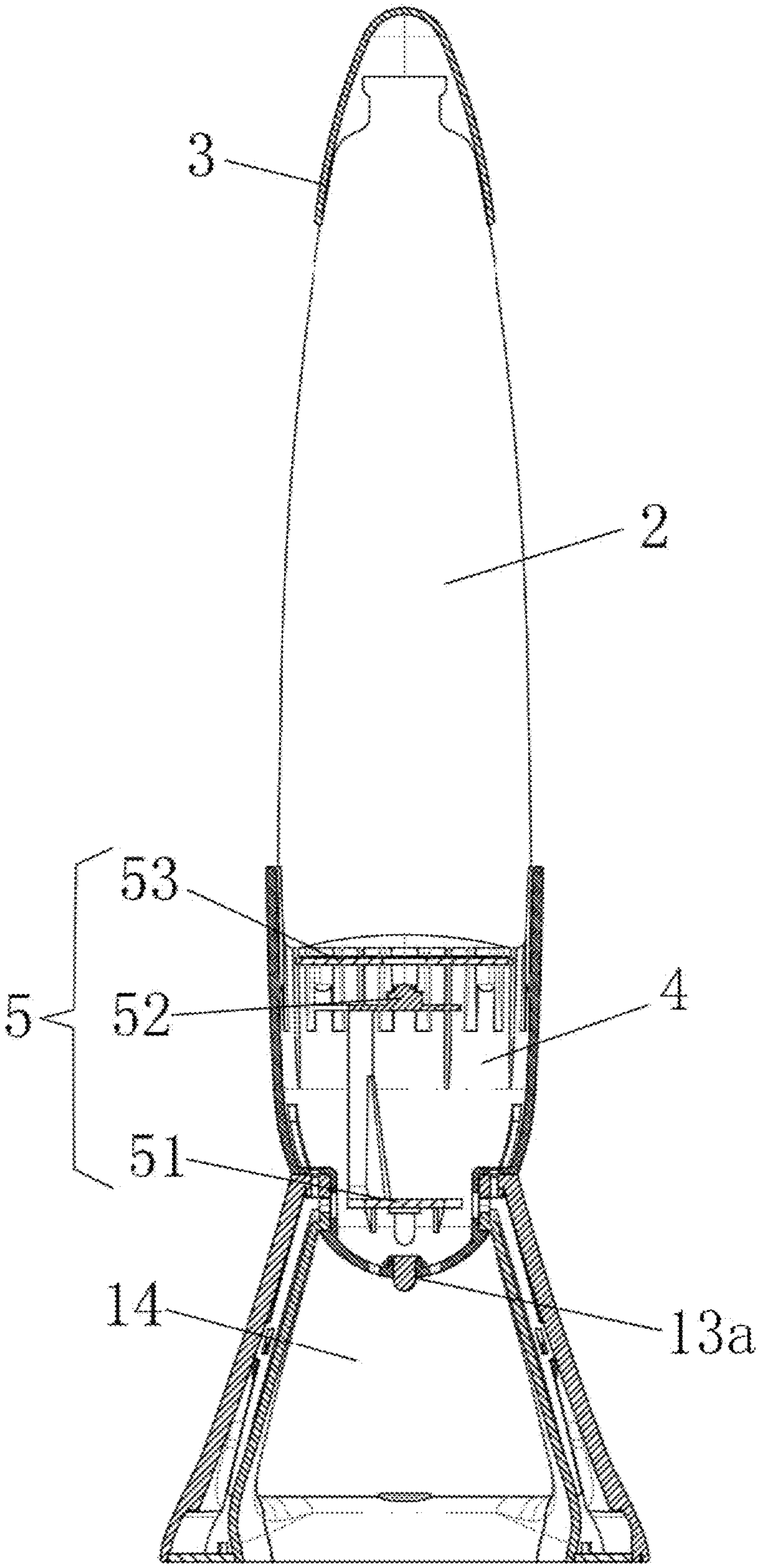
FIG. 2 illustrates a cross-sectional view of a lava lamp according to the embodiment of the present disclosure.
Figure 3:
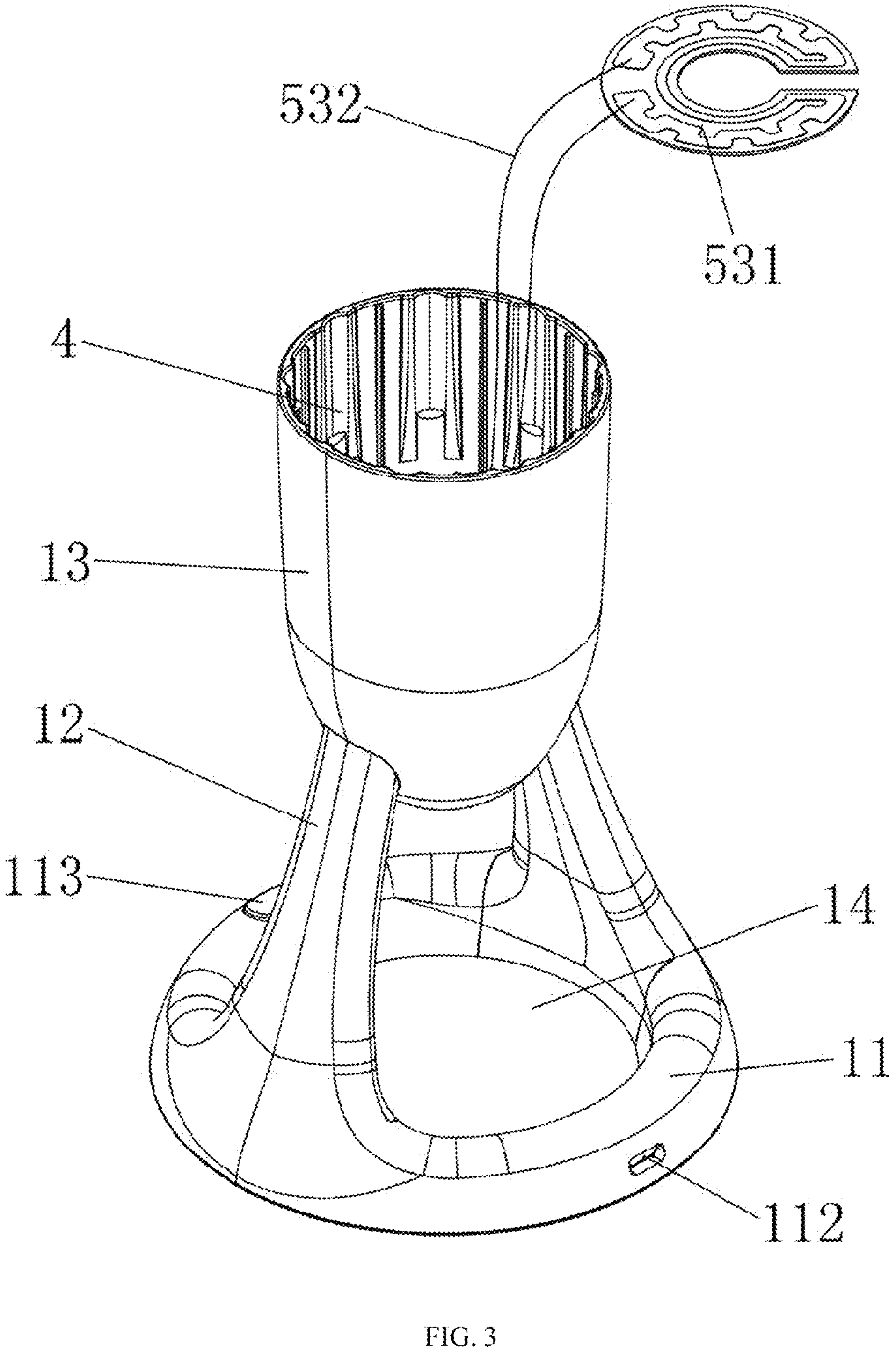
FIG. 3 illustrates a schematic diagram of a base according to the embodiment of the present disclosure.
Figure 4:
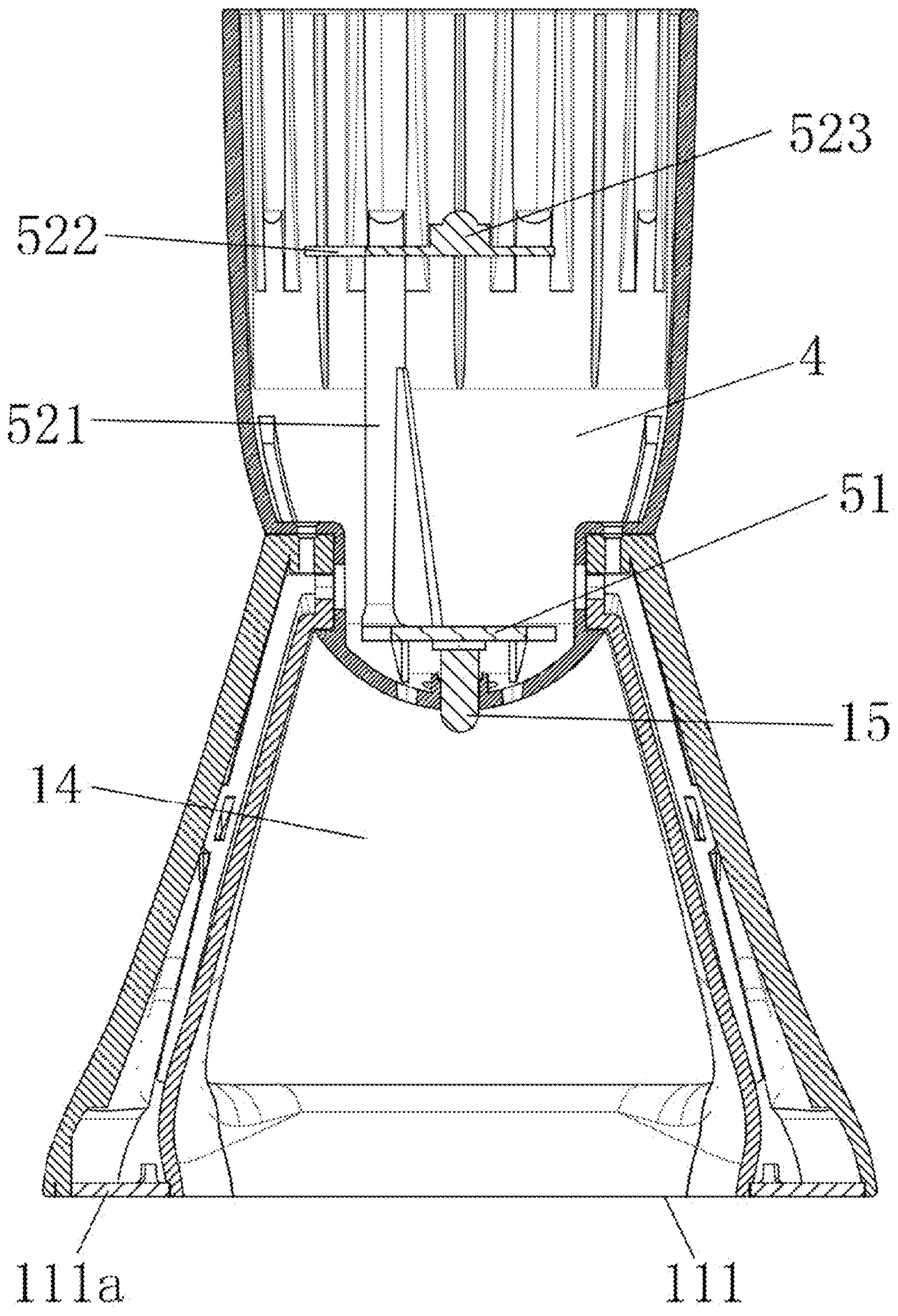
FIG. 4 illustrates a cross-sectional view of a base according to the embodiment of the present disclosure.
Figure 5:
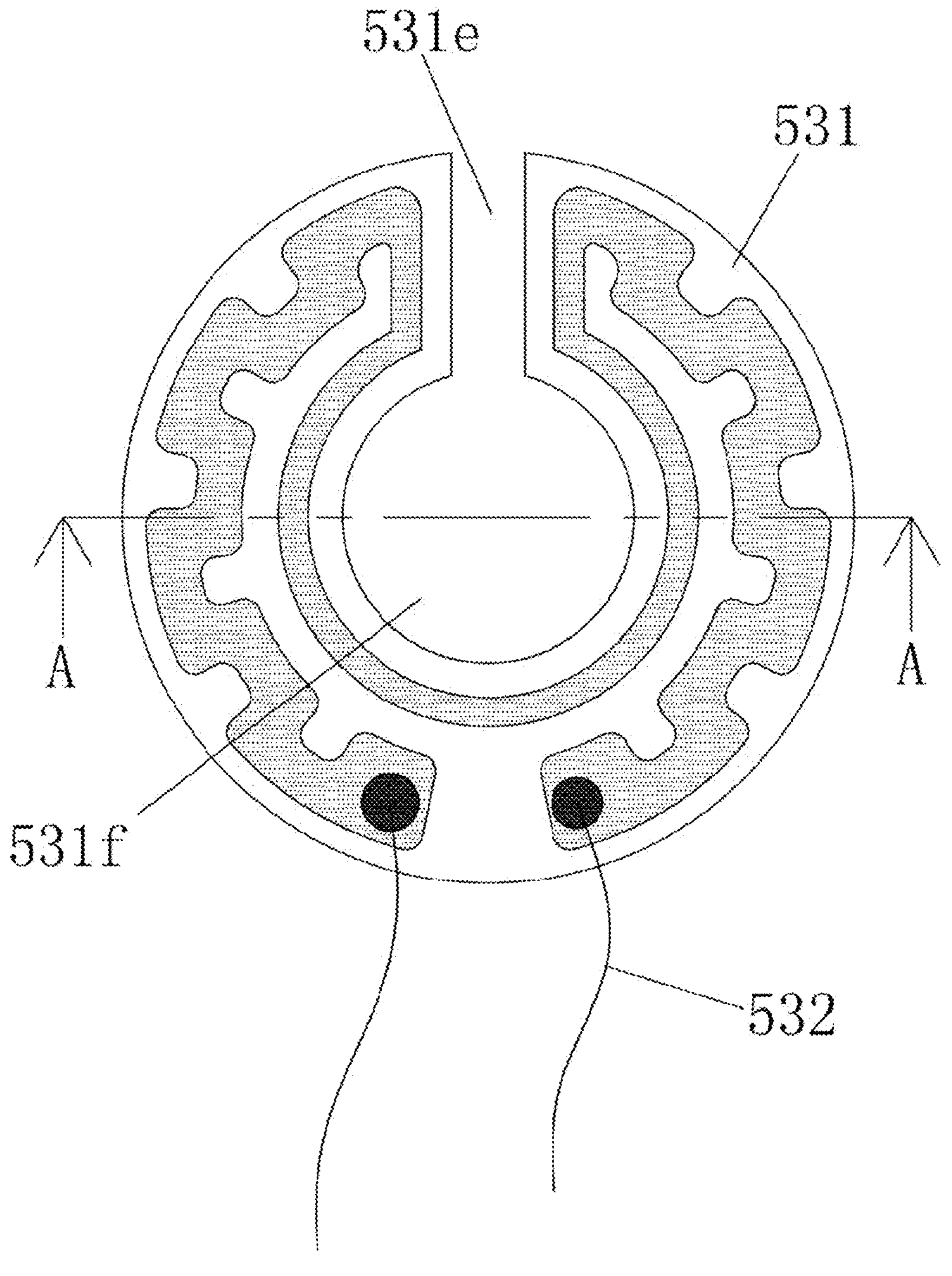
FIG. 5 illustrates a schematic diagram of a heater plate according to the embodiment of the present disclosure.
Figure 6:
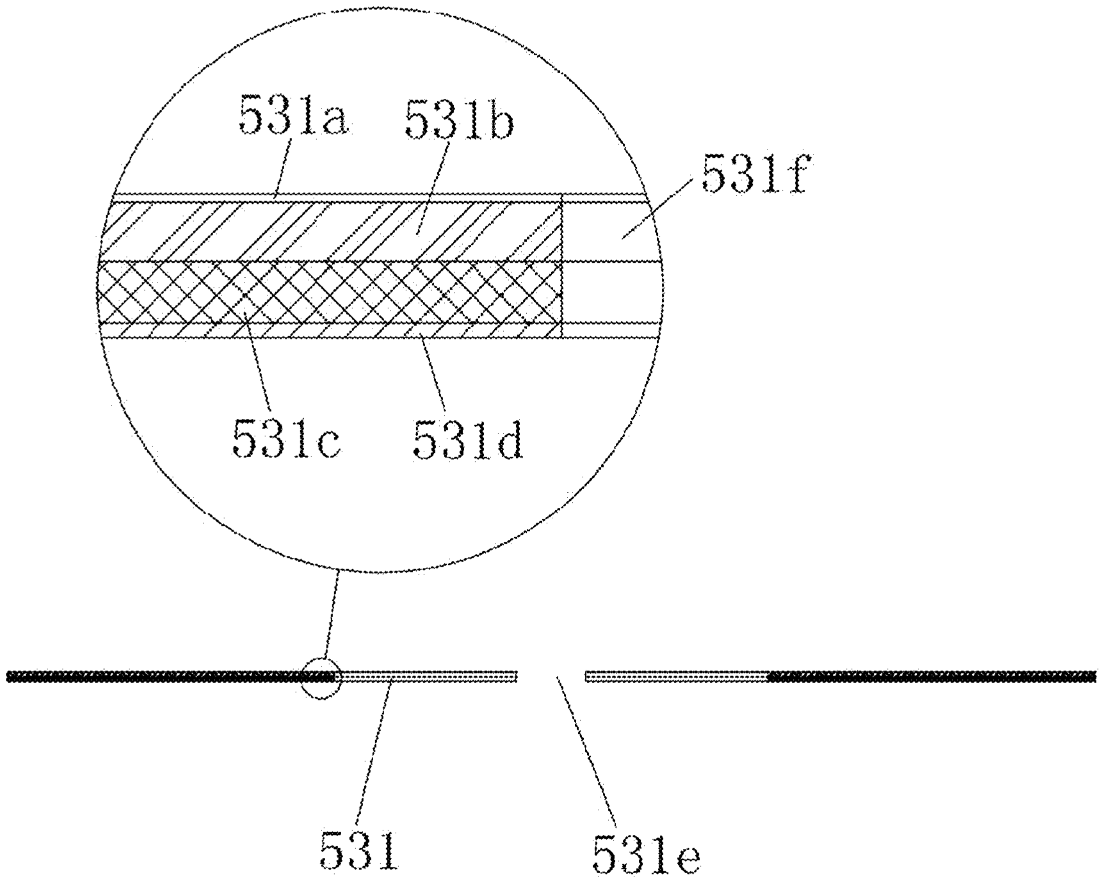
FIG. 6 illustrates a cross-sectional view of the heater plate illustrated in FIG. 5 along the A-A section line according to the embodiment of the present disclosure.

As illustrated in FIG. 1 to FIG. 6, an embodiment provides a heater-plate-affixed LED lava lamp, including a base 1, a transparent lava lamp bottle 2 located on the base 1, and a cap 3 located on the top of the transparent lava lamp bottle 2. The base 1 defined an opening upwardly-facing chamber 4, and the transparent lava lamp bottle 2 is fitly inserted into the chamber 4. Specifically, the inner edge of the opening of the chamber 4 is provided with a clamping mechanism to clamp the transparent lava lamp bottle 2. The chamber 4 is an up-wide-low-narrow conical structure. When the transparent lava lamp bottle 2 is put into the chamber 4 for a certain distance, the transparent lava lamp bottle 2 can be clamped by the clamping mechanism against the outer side of the transparent lava lamp bottle 2. A control device 5 is located in the chamber 4 and includes a control circuit board 51 located at the bottom of the chamber 4 and a heat-generating module 53 connected to the control circuit board 51. The heat-generating module 53 includes a heater plate 531 and multiple heating wires 532 electrically connected between the heater plate 531 and the control circuit board 51, and the heater plate 531 is affixed to the bottom of the transparent lava lamp bottle 2 and configured to heat the bottom of the transparent lava lamp bottle 2. The heater plate 531 is powered by the multiple heating wires 532 to generate heat. The heat is transferred to the transparent lava lamp bottle 2, and when the transparent lava lamp bottle 2 is heated to a certain temperature, the wax liquid will produce a brilliant visual effect.

Specifically, the heater plate 531 sequentially includes an adhesive layer 531*a*, an insulating layer 531*b*, a heating layer 531*c* and a wrapping layer 531*d*. The insulating layer 531*b* is tightly adhered to the bottom of the transparent lava lamp bottle 2 by the adhesive layer 531*a*. The heating layer 531*c* is wrapped around the insulating layer 531*b* by the wrapping layer 531*d*. By affixing the heater plate 531 to the bottom of the transparent lava lamp bottle 2, when the heater-plate-affixed LED lava lamp is subjected to an external force, the heater plate 531 can always maintain being-affixed state without shaking or randomly swaying, which ensures the heating efficiency. At the same time, the way of using the heater plate 531 to heat also enables the heater plate 531 to be completely adhered to the transparent lava lamp bottle 2, which reduces the loss of heat and avoids the waste of energy.

Further, the control device 51 also includes a lighting module 52 connected to the control circuit broad 51. The lighting module 52 is configured to emit light to the transparent lava lamp bottle 2. The lighting module 52 illuminates the transparent lava lamp bottle upwards, and the color of the light can be changed by the lighting module 52 to improve decorative effect.

Further, an end of each of the multiple heating wires 532 is connected to the heating layer 531*c* and the other end of each of the multiple heating wires 532 is connected to the control circuit board 51. The length of the multiple heating wires 532 is 1.5 to 2 times the height of the chamber 4. As the heater plate 531 needs the electric power supplied by the multiple heating wires 532, the heating wires 532 need to be pulled out of the chamber 4 when affixing the heater plate 531, and the heated wires 532 need to be sufficiently long to facilitate affixing.

Further, the heating layer 531*c* uses a heating resistor as the heat-generating module 53, so it is necessary to flatten and spread the heating resistor on the insulating layer 531*b*. In order to maximize the spread area, the heating layer 531*c* is provided with a bending structure, and the heating effect of the heater plate 531 is better by bending the heating resistor into a wave shape to increase the area.

Further, in order not to interfere with the irradiation of the lighting module 52, the heater plate 531 is a circular structure and defines a light-transmitting area 531*f* in its middle, where the light emitted by lighting module 52 passes through to the transparent lava lamp bottle 2. The light-transmitting area 531*f* may be a transparent film or a hole.

In an embodiment, the light-transmitting area 531*f* is the hole, which prevents the intensity of the light from being diminished when the light passes through the light-transmitting area 531*f*. In addition, the heater plate 531 defines a notch 531*e* configured to make the heater plate 531 fitted to a special-shaped surface. The notch 531*e* is connected to the hole. By means of this structure, the heater plate 531 can be adhered not only to a concave surface but also to multiple special-shaped surfaces such as conical surfaces or convex surfaces. Thus, the base 1 can be adapted to different types of transparent lava lamp bottles 2, which makes it more practical.

In an embodiment, the lighting module 52 includes a bracket 521 located on the control circuit board 51, a LED circuit board 522 mounted on the bracket 521 and at least one LED lamp 523 disposed on the LED circuit board 522. The embodiment is preferably provided with five LED lamps 523. The five LED lamps 523 are arranged in the shape of a cross. The five LED lamps 523 are disposed in the center of the LED circuit board 522, which enables the light to be concentrated in the center and to better pass through the heater plate 531 to the transparent lava lamp bottle 2 and thereby improving the decorative effect.

In this embodiment, the base 1 includes a base body 11, a holder 12 and a cup body 13. The holder 12 is located on the top of the base body 11. The cup body 13 is located on the top of the holder 12. The cup body 13 defines the chamber 4.

Further, the holder 12 and the base body 11 define the cavity 14, which can also provide a three-dimensional sense for the base 1 to improve aesthetics. The cup body 13 defines a through hole 13*a* at the bottom connected to the cavity 14. An inductive probe 15 is installed in the through hole 13*a* and protrudes outwardly from the through hole 13*a*. The inductive probe 15 is electrically connected to the control circuit board 51, which enables the base 1 to receive control signals so as to remotely control the turning on or off of the heater-plate-affixed lava lamp, bringing more convenience.

Further, the base body 11 is a circular structure, the circular structure with a hollow design can improve the three-dimensional sense and aesthetic degree. The bottom of the base body 11 is provided with a support surface 111. The support surface 111 is provided with an anti-slip sheet 111*a* so that the base 1 can be more stable to prevent sliding when subjected to an external force.

Further, the base body 11 is provided with a power interface 112 for connecting the power supply. In an embodiment, the power interface 112 adopts an USB interface commonly used by people so the connection is more convenient. The adopted USB interface eliminates the need for additional interface design, reducing the cost. Meanwhile the base body 11 is provided with a push switch 113 on the side facing away from the power interface 112.

Further, the base body 11 and the holder 12 are hollowed-out and connected to the chamber 4. The push switch 113 and the power interface 112 are connected to the control circuit board 51 via wires passing through the interior of the holder 12. The wires are set inside the holder 12 to be hidden, improving the aesthetics of the base 1.

The above embodiments are only a description of exemplary embodiments of the present disclosure. Without departing from the design spirit of the present disclosure, all changes, modifications, and replacements made by those skilled in the art to the technical solutions of the present disclosure should fall within the scope of protection defined in the claims of the present disclosure.

What is claimed is:

1. A heater-plate-affixed light-emitting diode (LED) lava lamp, comprising:

a base (1);

a transparent lava lamp bottle (2), located on the base (1); wherein the base (1) defines a chamber (4); and a control device (5), located in the chamber (4); wherein the control device (5) comprises: a control circuit board (51) located at a bottom of the chamber (4); a heat-generating module (53) connected to the control circuit board (51); the heat-generating module (53) comprises: a heater plate (531) and a plurality of heating wires (532), the heater plate (531) is affixed to a bottom of the transparent lava lamp bottle (2) and configured to heat the bottom of the transparent lava lamp bottle (2), and the plurality of heating wires (532) are electrically connected between the heater plate (531) and the control circuit board (51); the heater plate (531) comprises: an adhesive layer (531*a*), an insulating layer (531*b*), a heating layer (531*c*) and a wrapping layer (531*d*); and the insulating layer (531*b*) is tightly adhered to the bottom of the transparent lava lamp bottle (2) by the adhesive layer (531*a*), and the heating layer (531*c*) is wrapped around the insulating layer (531*b*) by the wrapping layer(531*d*).

2. The heater-plate-affixed LED lava lamp as claimed in claim 1, wherein the control device (5) further comprises: a lighting module (52) electrically connected to the control circuit board (51); and the lighting module (52) is configured to emit light to the transparent lava lamp bottle (2).

3. The heater-plate-affixed LED lava lamp as claimed in claim 1, wherein an end of each of the plurality of heating wires (532) is connected to the heating layer (531*c*) and the other end of each of the plurality of heating wires (532) is connected to the control circuit board (51); and a length of the plurality of heating wires (532) is 1.5 to 2 times a height of the chamber (4).

4. The heater-plate-affixed LED lava lamp as claimed in claim 2, wherein the heater plate (531) defines a light-transmitting area (531*f*) in a middle of the heater plate (531); the light emitted by the lighting module (52) passes through the light-transmitting area (531*f*) and irradiates onto an interior of the transparent lava lamp bottle (2), and the light-transmitting area (531*f*) is a transparent film or a hole.

5. The heater-plate-affixed LED lava lamp as claimed in claim 4, wherein the light-transmitting area (531*f*) is the hole; the heater plate (531) defines a notch (531*e*) configured to make the heater plate (531) fitted to a special-shaped surface, and the notch (531*e*) is connected to light-transmitting area (531*f*).

6. The heater-plate-affixed LED lava lamp as claimed in claim 1, wherein the base (1) comprises: a base body (11), a holder (12) and a cup body (13); the holder (12) is located at a top of the base body (11), the cup body (13) is located at a top of the holder (12), and the cup body (13) defines the chamber (4).

7. The heater-plate-affixed LED lava lamp as claimed in claim 6, wherein the base body (11) and the holder (12) together define a cavity (14); a bottom of the cup body (13) defines a through hole (13*a*) connected to the cavity (14); an inductive probe (15) protrudes outwardly from the through hole (13*a*); and the inductive probe (15) is electrically connected to the control circuit board (51) to receive control signals.

8. The heater-plate-affixed LED lava lamp as claimed in claim 6, wherein the base body (11) is a circular structure; and a bottom of the base body (11) is provided with a support surface (111), and the support surface (111) is provided with an anti-slip sheet (111*a*).

* * * * *